United States Patent [19]
Mikulski

[11] 3,886,059
[45] May 27, 1975

[54] GUIDE FOR ELECTROCHEMICAL DRILLING

[75] Inventor: Walter E. Mikulski, Glastonbury, Conn.

[73] Assignee: United Aircraft Corporation, East Hartford, Conn.

[22] Filed: June 25, 1974

[21] Appl. No.: 482,954

Related U.S. Application Data

[62] Division of Ser. No. 374,610, June 28, 1973, Pat. No. 3,842,480.

[52] U.S. Cl............. 204/224 M; 204/225; 204/286; 204/297 R
[51] Int. Cl. ....... B23p 1/12; B01k 3/04; C23b 5/70
[58] Field of Search ........... 204/224 M, 297 R, 225, 204/288, 286

[56] References Cited
UNITED STATES PATENTS

| | | | |
|---|---|---|---|
| 3,642,601 | 2/1972 | Kondo | 204/224 M X |
| 3,696,014 | 10/1972 | Goodard et al. | 204/224 M X |
| 3,719,579 | 3/1973 | Cross et al. | 204/297 R X |

Primary Examiner—John H. Mack
Assistant Examiner—D. R. Valentine
Attorney, Agent, or Firm—Charles A. Warren

[57] ABSTRACT

This invention relates to a guide for use in guiding electrodes toward and into a workpiece in an electrochemical drilling operation and to a method for making the guide.

5 Claims, 3 Drawing Figures

PATENTED MAY 27 1975 3,886,059

GUIDE FOR ELECTROCHEMICAL DRILLING

This is a division of application Ser. No. 374,610, filed June 28, 1973, now U.S. Pat. No. 3,842,480.

BACKGROUND OF THE INVENTION

In the production of machine parts having a plurality of small holes therein, the technique of electrochemical drilling has been successful where the holes to be drilled are all parallel to one another. Where the holes are not parallel, as for example the cooling pasages in the leading or trailing edge of a turbine vane or blade, where the blade has a twist therein, it has been found difficult to support the electrodes in such a way as to produce the plurality of nonparallel holes at one time.

SUMMARY OF THE INVENTION

One feature of this invention is a guide constructed to support the several electrodes so that each will be guided directly along the axis of the hole to be drilled even though none of the holes are parallel to one another. Another feature is a guide that will permit reciprocatory movement of the inoperative ends of all of the electrodes by a single slide to be converted into movement of the operative tips precisely axially of the individual holes all at one time. Another feature is a method of making this guide so that it will produce the desired result.

DETAILED DESCRIPTION OF THE PREFERRED EMBODIMENT

Figure 2:
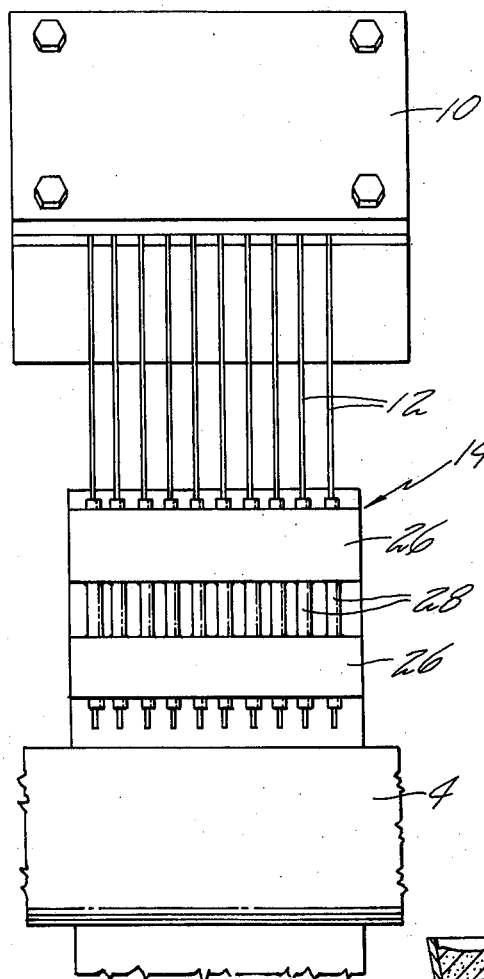
FIG. 2 is a side elevation on a larger scale of the guide block, parts being broken away and in section.
Figure 1:
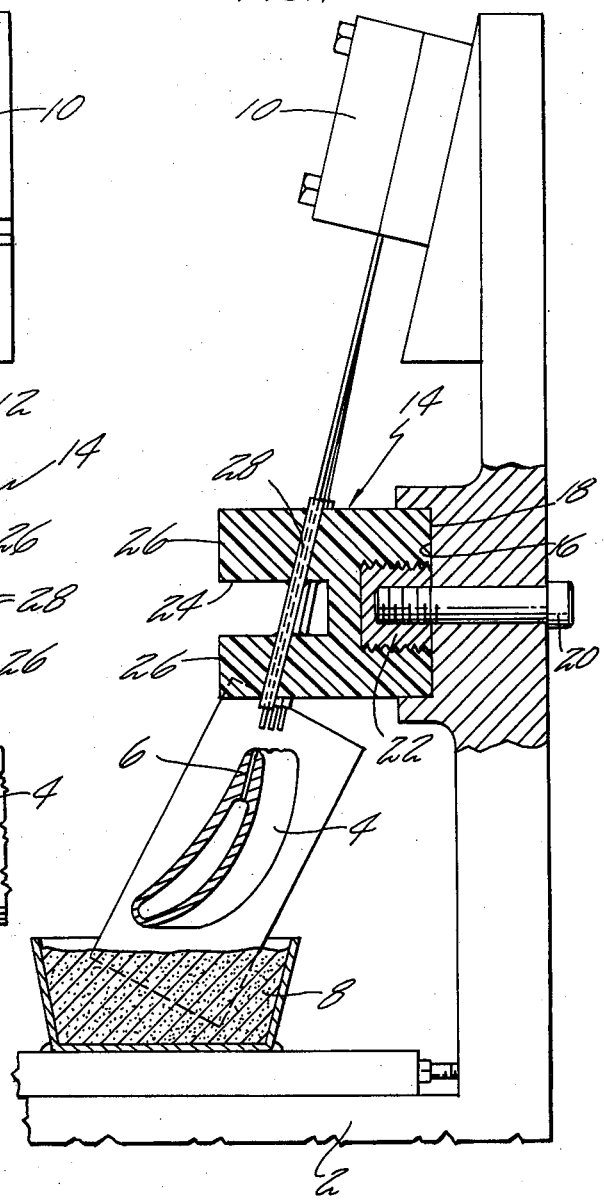
FIG. 1 is a diagrammatic view of a machine to which the guide block is attached.
Figure 3:
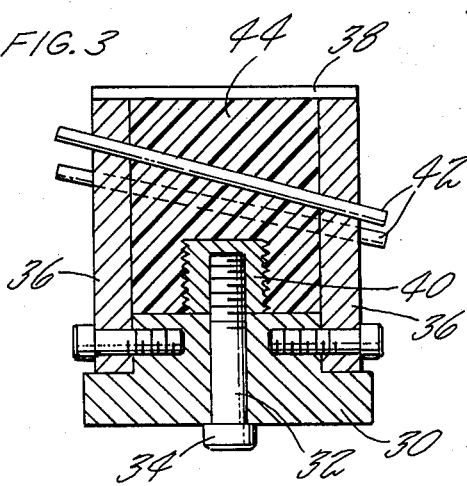
FIG. 3 is a sectional view through a mold for the guide block.

Referring first to FIG. 1, the guide block is used in an electrochemical drilling machine that has a base 2 on which a workpiece 4 is mounted for the purpose of having a plurality of holes 6 drilled in the trailing edge. The workpiece is shown as a hollow turbine vane. The workpiece 4 is mounted in a fixture 8 that holds the workpiece in fixed relation on the base.

Also mounted on the base is a vertically reciprocable slide 10 which supports the inoperative end of the electrodes 12 and supplies electrolyte thereto from a suitable chamber in the slide.

Below the slide 10 is the guide 14 of the invention which serves to guide the individual electrodes from the substantially vertical position where they project down from the slide into precisely axial relation to the respective holes to be drilled in the workpiece. To accomplish this the guide, which is a dielectric and preferably an epoxy is in the form of a cast block or base having a flat surface 16 for engagement with a cooperating locating surface 18 on the machine base and is held thereon by one or more bolts 20 engaging in a threaded insert 22 cast into the block.

On the side opposite the surface 16 the guide has a deep notch 24 therein defining spaced flanges 26. Suitable dielectric guide tubes 28 are positioned in holes formed in the base and these guide tubes receive the individual electrodes slidably therein. These tubes are positioned so that each tube is precisely axial to the hole to be drilled in the workpiece by the electrode guided therein such that the substantially vertical movement of the electrodes is directed into movement precisely in alignment with the several holes to be drilled by the respective electrodes. These electrodes are somewhat flexible to accomplish this purpose. These electrodes are well known and may be for example of the type shown and described in Joslin U.S. Pat. No. 3,647,674. The diameters of the guide tubes are such as to provide the required precision of the holes with relation to one another and to permit the desired sliding movement of the electrodes therein. It will be understood that the guide may be very closely located to the workpiece for best precision results.

The electrodes are hollow for the flow of electrolyte therethrough and the holes are rapidly drilled in the workpiece by conventional electrochemical drilling techniques.

In making the guide for the electrodes a mold is made with a base plate 30 having a hole 32 therein to receive an attachment bolt 34 and having spaced side plates 36 and end plates 38 to form a box. A threaded insert 40 is positioned on the bolt 34 to be cast into the guide. The side plates 36 have aligned holes therein machined in precise relation to one another and in precise axial relation to the holes to be drilled in a workpiece. Such holes may be readily produced by the conventional tape controlled machine tools now in use. In these holes are positioned gage pins 42 extending between and through the side plates. A suitable dielectric such as an epoxy 44 is then poured into the box defined by the side and end plates and around the gage pins and the insert and allowed to harden. Subsequently the gage pins are withdrawn, the bolt 34 is removed and the solidified epoxy removed from the box. The guide tubes 28 may be then positioned in the solid block and secured therein as by a suitable wax.

Prior to inserting the tubes 28, which are preferably of glass the notch 24 may be milled therein. The block may be used solid without cutting the notch. Thereafter the guide is positioned on the machine, the dielectrodes positioned in the guide tubes, the supply of electrolyte and the electrical potential between the electrodes and workpiece established and the electrodes fed toward and into the workpiece by downward movement of the slide.

Although the invention has been shown and described with respect to preferred embodiments thereof, it should be understood by those skilled in the art that various changes and omissions in the form and detail thereof may be made therein without departing from the spirit and the scope of the invention.

I claim:

1. A guide to support electrodes for multiple electrochemical drilling including:
    a base having a plurality of holes therein in predetermined relation to one another and all normal to the hole to be drilled by the electrode guided therein, said base having a threaded fitting for attachment to a machine base, and
    a plurality of dielectric tubes positioned in said holes for guiding the electrodes,
    the inner diameter of the tubes being such as to guide the electrode therein and to permit axial movement of the electrode for the drilling operation.

2. A guide as in claim 1 in which the base has a flat surface surrounding and normal to the fitting for engagement with a machine surface.

3. A guide as in claim 1 in which the dielectric tubes are secured against movement in the base.

4. In the electrochemical drilling of a plurality of nonparallel holes in a workpiece, in where the electrodes are fed toward and into the workpiece in drilling the holes, a guide for attachment to the machine for guiding the several electrodes simultaneously, said guide including:
- a base having a locating surface for location on a machine,
- said locating surface having an attachment means therein for securing the base to the machine,
- said base having a plurality of passages therethrough in perpendicular relation to the holes to be drilled by the electrodes, and
- dielectric tubes in said passages to guide electrodes positioned therein into and out of the workpiece in drilling the holes therein.

5. A guide as in claim 4 in which the tubes are secured against movement in the base.

* * * * *